US010584393B2

(12) United States Patent
Dry et al.

(10) Patent No.: US 10,584,393 B2
(45) Date of Patent: Mar. 10, 2020

(54) SMELTING PROCESS AND APPARATUS

(71) Applicant: Tata Steel Limited, Mumbai (IN)

(72) Inventors: Rodney James Dry, City Beach (AU);
Jacques Pilote, Woodlands (AU);
Hendrikus Koenraad Albertus Meijer,
Uitgeest (NL)

(73) Assignee: Tata Steel Limited, Mumbai (IN)

( * ) Notice: Subject to any disclaimer, the term of this patent is extended or adjusted under 35 U.S.C. 154(b) by 359 days.

(21) Appl. No.: 15/104,348

(22) PCT Filed: Dec. 19, 2014

(86) PCT No.: PCT/AU2014/001146
§ 371 (c)(1),
(2) Date: Jun. 14, 2016

(87) PCT Pub. No.: WO2015/089563
PCT Pub. Date: Jun. 25, 2015

(65) Prior Publication Data
US 2016/0312321 A1 Oct. 27, 2016

(30) Foreign Application Priority Data
Dec. 20, 2013 (AU) .............................. 2013904992

(51) Int. Cl.
*C21B 13/14* (2006.01)
*C21C 5/56* (2006.01)
(Continued)

(52) U.S. Cl.
CPC .......... *C21B 13/143* (2013.01); *C21B 13/004* (2013.01); *C21B 13/0026* (2013.01);
(Continued)

(58) Field of Classification Search
CPC . C21B 13/0026; C21B 13/004; C21B 13/143;
C21C 5/567; C22B 34/1263;
(Continued)

(56) References Cited

U.S. PATENT DOCUMENTS 3,456,928 A * 7/1969 Selway .................. B01D 47/06
261/115
3,835,796 A * 9/1974 Sanga .................... B01D 47/06
110/119
(Continued)

FOREIGN PATENT DOCUMENTS

WO 2000/001854 1/2000
WO 2000/001855 1/2000
(Continued)

OTHER PUBLICATIONS

Feb. 24, 2015—International Search Report of PCT/AU2014/001146.

*Primary Examiner* — Jessee R Roe
*Assistant Examiner* — Michael Aboagye
(74) *Attorney, Agent, or Firm* — Banner & Witcoff, Ltd.

(57) ABSTRACT

A smelting apparatus that includes (a) a smelting vessel (4) that is adapted to contain a bath of molten metal and slag and (b) a smelt cyclone (2) for pre-treating a metalliferous feed material positioned above and communicating directly with the smelting vessel The apparatus also includes an oft-gas duct (9) extending from the smelt, cyclone for discharging an off-gas from the smelt cyclone. The off-gas duct has an inlet section (18) that extends upwardly from the smelt cyclone and is formed to cause off-gas to undergo a substantial change of direction as it flows through the inlet section of the off-gas duct.

6 Claims, 2 Drawing Sheets

(51) Int. Cl.
  *F27B 1/10*   (2006.01)
  *F27D 3/15*   (2006.01)
  *F27D 3/18*   (2006.01)
  *F27D 17/00*  (2006.01)
  *C21B 13/00*  (2006.01)
  *C22B 34/12*  (2006.01)
  *F27D 3/16*   (2006.01)

(52) U.S. Cl.
  CPC .......... *C21C 5/567* (2013.01); *C22B 34/1263* (2013.01); *C22B 34/1295* (2013.01); *F27B 1/10* (2013.01); *F27D 3/1509* (2013.01); *F27D 3/1545* (2013.01); *F27D 3/18* (2013.01); *F27D 17/001* (2013.01); *F27D 17/008* (2013.01); *F27D 2003/164* (2013.01); *F27D 2003/168* (2013.01); *Y02P 10/136* (2015.11)

(58) Field of Classification Search
  CPC ...... C22B 34/1295; F27B 1/10; F27D 17/001; F27D 17/008; F27D 3/1509; F27D 3/1545; F27D 3/18
  USPC ........... 266/193, 149, 159; 75/414, 489, 382
  See application file for complete search history.

(56) References Cited

U.S. PATENT DOCUMENTS

| | | | | |
|---|---|---|---|---|
| 4,946,498 | A * | 8/1990 | Weber | C21B 13/14 266/160 |
| 5,135,572 | A * | 8/1992 | Ibaraki | C21B 13/0006 75/502 |
| 5,639,293 | A * | 6/1997 | Bernard | C21B 13/0006 266/182 |
| 6,328,790 | B1 * | 12/2001 | Schwab | B01D 47/06 261/116 |
| 6,440,195 | B1 * | 8/2002 | Dry | C21B 13/0013 75/453 |
| 6,585,929 | B1 | 7/2003 | Bates et al. | |
| 2007/0074644 | A1 * | 4/2007 | Huning | C21B 11/02 110/203 |
| 2014/0124993 | A1 * | 5/2014 | Pekkala | B01D 47/06 266/147 |

FOREIGN PATENT DOCUMENTS

| | | |
|---|---|---|
| WO | 2000/022176 | 4/2000 |
| WO | 2007/098550 A1 | 9/2007 |
| WO | 2007/098552 A1 | 9/2007 |
| WO | 2013/082658 A1 | 6/2013 |
| WO | 2014/015364 A1 | 1/2014 |

* cited by examiner

SMELTING PROCESS AND APPARATUS

CROSS-REFERENCE TO RELATED APPLICATIONS

The present application is a U.S. National Phase filing of International Application No. PCT/AU 2014/001146, filed on Dec. 19, 2014, designating the United States of America and claiming priority to Australian Patent Application No. 2013904992 filed Dec. 20, 2013. The present application claims priority to and the benefit of all the above-identified applications, which are all incorporated by reference herein in their entireties.

TECHNICAL FIELD

The present invention relates to a process and an apparatus for smelting a metalliferous material.

In particular, although by no means exclusively, the present invention relates to a smelting process and apparatus fir smelting an iron-containing material, such as an iron ore, and producing iron.

BACKGROUND

A known molten bath-based smelting process is referred to hereinafter as the "HIsarna" process.

The term "smelting" is herein understood to mean thermal processing wherein chemical reactions that reduce metal oxides take place to produce molten metal.

The HIsarna process and apparatus are described in International application PCT/AU99/00884 (WO 00/022176) in the name of the applicant.

The HIsarna process is associated particularly with producing molten iron from iron ore or another iron-containing material.

The HIsarna process is carried out in a smelting apparatus that includes (a) a smelting vessel that defines a smelting chamber and includes lances for injecting solid feed materials and oxygen-containing gas into the smelting chamber and is adapted to contain a bath of molten metal and slag and (b) a smelt cyclone for pre-treating a metalliferous feed material that defines a cyclone chamber and includes tuyeres for injecting solid feed materials and oxygen-containing gas into the cyclone chamber and is positioned above and communicates directly with the smelting vessel.

The term "smelt cyclone" is understood herein to mean a vessel that typically defines a vertical cylindrical chamber and includes tuyeres for injecting solid feed materials and oxygen-containing gas into the chamber and is constructed, so that feed materials supplied to the chamber move in a path around a vertical central axis of the chamber and can withstand high operating temperatures sufficient to at least partially melt metalliferous feed materials.

The smelting vessel includes refractory-lined sections in a lower hearth and water cooled panels in a side wall and as roof of the vessel, and water is circulated continuously through the panels in a continuous circuit.

The smelting vessel also includes a forehearth connected to the smelting chamber via a forehearth connection that allows continuous metal product outflow from the vessel. A forehearth operates as a molten metal-filled siphon seal, naturally "spilling" excess molten metal from the smelting vessel as it is produced. This allows the molten metal level in the smelting chamber of the smelting vessel to be known and controlled to within a small tolerance—this is essential for plant safety.

In one form of the HIsarna process, carbonaceous feed material (typically coal) and optionally flux (typically calcined limestone) are injected into a molten bath in the smelting chamber of the smelting vessel. The carbonaceous material is provided as a source of a reductant and a source of energy. Metalliferous feed material, such as iron ore, optionally blended with flux, is injected into and heated and partially incited and partially reduced in the smelt cyclone. This molten, partly reduced, metalliferous material flows downwardly from the smelt cyclone into the molten bath in the smelting vessel and is smelted to molten metal in the bath.

Hot reaction gas (typically $CO$, $CO_2$, $H_2$, and $H_2O$) produced in the molten bath is partially combusted by oxygen-containing gas (typically technical-grade oxygen) in an upper part of the smelting chamber. Heat generated by the post-combustion is transferred to molten droplets in the upper section that fall back into the molten bath to maintain the temperature of the bath.

The hot, partially-combusted reaction gas flows upwardly from the smelting chamber and enters the bottom of the smelt cyclone. Oxygen-Containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen containing gas loads to further combustion of smelting vessel gases, resulting in very hot (cyclonic) flames. Incoming metalliferous teed material to the smelt cyclone, typically in the form of fines, is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the smelting chamber. The hot, partially melted metalliferous feed material is thrown outwards onto the walls of the smelt cyclone by cyclonic swirl action and, as described above, flows downwardly into the smelting vessel below for smelting in the smelting chamber of that vessel.

Off-gas resulting from the further post-combustion of reaction gases in the smelt cyclone is taken away from an upper region of the smelt cyclone through an off-gas duct.

The net effect of the above-described form of the HIsarna process is a two-step counter-current process. Metalliferous feed material is heated and partially reduced in the smelt cyclone by outgoing reaction gases from the smelting vessel (with oxygen-containing gas addition) and flows downwardly from the smelt cyclone into the smelting vessel and is smelted to molten iron in the smelting chamber of the smelting vessel. In a general sense, this counter-current arrangement increases productivity and energy efficiency.

The above description is not to be taken as an admission of the common general knowledge in Australia or elsewhere.

SUMMARY OF THE DISCLOSURE

The present invention is based on a realisation that undesirable slag foaming events in a smelting chamber of a smelting vessel of an HIsarna smelting apparatus may be caused by large solid or near solid, iron oxide-rich accretions (hereinafter referred to as "accretions") breaking of from an off-gas duct above a smelt cyclone of the apparatus and falling into the molten bath in the smelting vessel, where they can cause a rapid carbon boil and very rapid foaming which is extremely difficult to contain. The applicant believes that these more or less regular falling solid lumps cause undesirable "mini carbon boil" events, each one increasing the CO released from the molten bath for a short time period.

In broad terms, the present invention provides a smelting apparatus that includes (a) a smelting vessel that defines a smelting chamber and is adapted to contain a bath of molten metal and slag and (b) a smelt eye one far pre-treating a metalliferous feed material that defines a cyclone chamber and is positioned above and communicates directly with the smelting vessel and (c) an off-gas duct extending from the smelt cyclone for discharging an off-gas from the smelt cyclone, with the off-gas duct having an inlet section that extends upwardly from the smelt cyclone and is formed to cause off-gas to undergo a substantial change of direction as it flows through the inlet section of the off-gas duct.

The inlet section includes (a) an upward, typically vertical, extension of the cyclone chamber that defines an upstream leg of the inlet section and (b) a downstream leg of the inlet section, with the downstream leg extending at an angle to the upstream leg so that the off-gas undergoes the substantial change in direction as it moves through a bend that interconnects the upstream and the downstream legs. The purpose of the substantial change in direction in the inlet section is to move off-gas quickly away from the upward, typically vertical, extension of the cyclone chamber. This encourages (a) liquid material to de-entrain in a high temperature section of the off-gas duct that is downstream of and displaced laterally from the upward extension (in the direction of flow of off-gas) and run back continuously into the molten bath in the smelting chamber and (b) accretions formed on walls in an upper part of the off-gas duct that is downstream of the high temperature downstream section to fall down in the high temperature downstream section and be melted there, with the resulting liquid falling directly into the molten bath in the smelting chamber.

It is noted that the accretions may be due to (a) molten material entrained in the off-gas solidifying on the walls that form the off-gas duct and (b) solid material entrained in the off-gas being deposited on the walls that form the off-gas duct.

The upstream leg of the inlet section of the inlet section may extend vertically upwardly from the smelt cyclone.

The bend of the inlet section may be in the form of a dog-leg bend that defines an included angle of at least 90°, typically 90-120°, between the upstream (in the direction of flow of off-gas) leg of the inlet section and the downstream leg of the inlet section. In use, the bend causes off-gas to undergo the substantial change of direction, with the gas angle change being an angle of at least 60°, typically 60-90°, as it flows through the inlet section into the downstream sections of the off-gas duct.

The bend of the inlet section may be cooled and constructed in such as way as to prevent growth of large solid accretions in this location.

The bend attic inlet section may include cooling elements, such as water-cooled staves.

The cooling elements may be any suitable elements.

As described above, the off-gas duct may include a downstream (in the direction of flow of off-gas) section that is a high temperature section, i.e. at a temperature that is above the solidification temperature range of slag.

The downstream section may be formed to cause off-gas to undergo another substantial change of direction as it flows through the downstream section. As with the first direction change described above, this second change of direction facilitates separating solid and liquid material from the off-gas. Moreover, as is described above, the downstream section is also a collection area for accretions that thrill on walls of the off-gas duct downstream of the downstream section and subsequently melt or fall off the walls. Over time, these accretions melt and the molten material flows back into the smelting chamber.

The downstream section may include a bend, typically a dog-leg bend, that defines an included angle of less than 90°, typically 60-90°, between an upstream leg in the direction of flow of off-gas and a downstream leg of the downstream section, with the bend causing off-gas to undergo the substantial change of direction through the angle as it flows through the downstream section.

The smelt cyclone may include tuyeres for injecting solid feed materials and oxygen-containing gas into the cyclone chamber.

The smelting vessel may include lances for injecting solid feed materials and oxygen containing gas into the smelting chamber.

According to the present invention there is provided a process for smelting a metalliferous feed material including smelting the metalliferous feed material in the molten bath of the smelting vessel in the above-described smelting apparatus.

The process may include (a) at least partially reducing and partially melting the metalliferous feed material in the smelt cyclone in the above-described smelting apparatus and (b) completely smelting the at least partially reduced/melted material in the molten bath of the smelting vessel of the apparatus.

The process may include maintaining an oxygen potential in the smelt cyclone that is sufficient so that the off-gas from the smelt cyclone has a post combustion degree of at least 80%.

The metalliferous feed material may be any material that contains metal oxides.

The metalliferous feed material may be ores, partly reduced ores and metal containing waste streams.

The metalliferous feed material may be an iron-containing feed material, such as an iron ore. In that event, the process may be characterised by maintaining a temperature of at least 1100° C., typically at least 1200° C. in the smelt cyclone.

The metalliferous feed material may be a titania slag.

The metalliferous feed material may be any other suitable material.

BRIEF DESCRIPTION OF THE DRAWINGS

The present invention is described further by way of example with reference to the accompanying drawings, of which.

DESCRIPTION OF EMBODIMENTS

Figure 1:
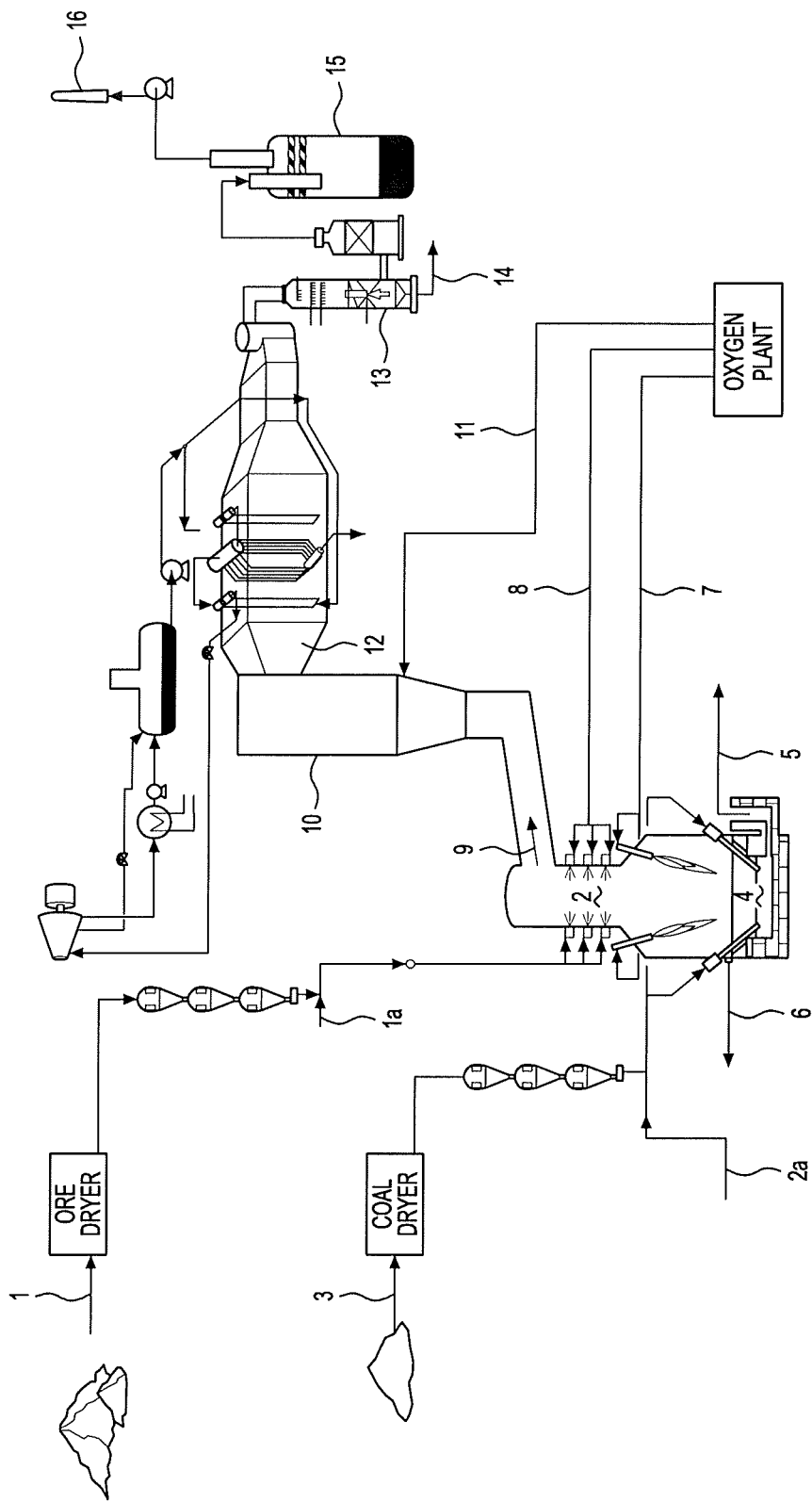
FIG. 1 is a schematic diagram which illustrates one embodiment of as plant for smelting iron-containing metalliferous feed material to molten iron in accordance with the HIsarna smelting process in the HIsarna smelting apparatus.

The process and the apparatus shown in FIG. 1 is an embodiment of the HIsarna process and apparatus.

The process and the apparatus of the invention are not confined to HIsarna process and apparatus and also extend to any other molten bath-based smelting process and apparatus.

The process and the apparatus shown in FIG. 1 are used on the use of an apparatus that includes a smelt cyclone 2 and a molten bath-based smelting vessel 4 located directly beneath the smelt cyclone 2, with direct communication between the chambers of the smelt cyclone 2 and the smelting vessel 4.

With reference to FIG. 1, a blend of metalliferous feed material in the form of magnetite-based ore (or other iron ore) with a top size of 6 Mitt and limestone is fed, via an ore dryer, into the smelt cyclone 2 using a pneumatic conveying gas 1a. Limestone represents roughly 8-10 wt % of the combined stream of ore and limestone. Coal 3 is fed, via a separate dryer, to the smelting vessel 4 where it is injected into a molten bath of metal and slag using conveying gas 2a. Oxygen 7 is injected into the smelting vessel 4 to post-combust gas, typically CO and $H_2$, generated in and released from the molten bath and provide the necessary heat for the smelting process in the bath before the gases flow upwardly from the smelting vessel 4 into the smelt cyclone 2. Oxygen 8 is injected into the smelt cyclone 2 to preheat and partly melt the ore. Specifically, the oxygen 8 further post-combusts gas, typically CO and $H_2$, generated in and released from the molten bath, resulting in very hot (cyclonic) flames in the smelt cyclone 2. Typically, the oxygen 7 and 8 is technical-grade oxygen.

The net effect of the above-described form of the HIsarna process is a two-step counter-current process. Metalliferous feed material is heated and partially reduced in the smelt cyclone 2 by outgoing reaction gases from the smelting vessel 4 and flows downwardly into the smelting vessel 4 and is smelted to molten iron.

Molten iron 5 is discharged from smelting vessel 4 via as forehearth.

Molten slag 6 produced in the process is discharged from smelting vessel 4 via a slag tap hole.

The operating conditions, including but not limited to coal and ore feed rates, oxygen teed rates to the direct smelting vessel 4 and the smelt cyclone 2 and heat losses from the smelting vessel 4, are selected so that off-gas leaving the smelt cyclone 2 via an off-gas outlet duct 9 has a post-combustion degree that is typically at least 90%.

Off-gas from the smelt cyclone 2 passes via an off-gas duct 9 to an off-gas incinerator 10, where additional oxygen 11 is injected to burn residual $CO/H_2$ and oxide a degree of free oxygen (typically 1-2%) in the fully combusted flue gas.

Fully combusted gas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is ted to a flue gas desulphurization unit 15.

Clean flue gas is then vented via a stack 16 gas consists mainly of $CO_2$ and, if appropriate, it can be compressed and geo-sequestered (with appropriate removal of residual non-condensable gas species).

The smelting vessel 4 is of the type describe in International publication WO 00/01854 in the name of the applicant and comprises a hearth formed of refractory material and side walls extending upwardly from the sides of the hearth, with the side wall including water cooled panels. The disclosure in the International publication is incorporated herein by cross-reference.

The above-described apparatus may be operated as described in the above Background section of specification to produce molten metal.

As is indicated above:

(a) undesirable slag foaming in the smelting chamber of the smelting vessel 4 may be caused by large solid (or near solid) iron oxide-rich accretions breaking of from the off-gas duct above the smelt cyclone and falling into the molten bath in the smelting vessel, where they cam cause a rapid carbon boil and foaming on the time-scale. of as minute or so;

(b) pilot plant trials indicate that the "product" falling into the smelting vessel from the smelt cyclone largely comprises liquid or slurry droplets and from time to time also comprises the solid accretions; and (c) the applicant believes that these more or less regular falling solid accretions cause undesirable "mini carbon boil" events, each one increasing CO for a short period.

Figure 3:
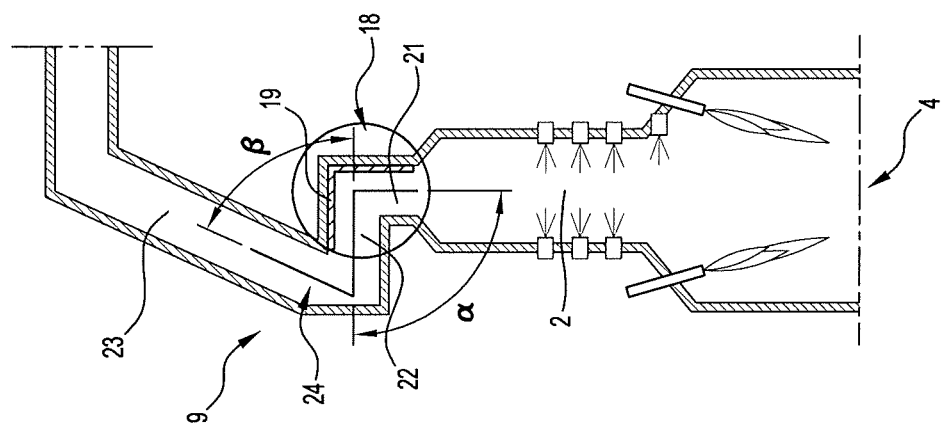
FIG. 3 is a schematic diagram which illustrates another, although not the only other, embodiment of an off-gas duct of the HIsarna smelting apparatus in accordance with the present invention.
Figure 2:
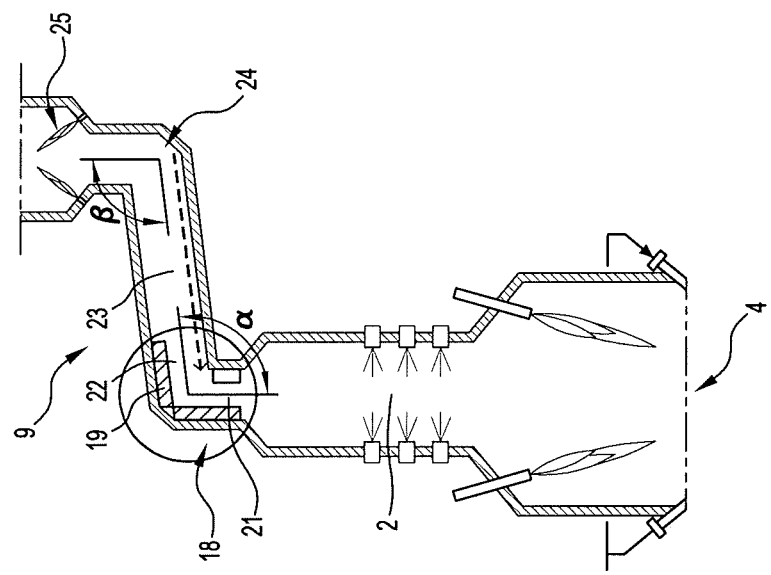
FIG. 2 is a schematic diagram which illustrates one embodiment of an off-gas duct of a HIsarna smelting apparatus in accordance with the present invention.

FIG. 2 and FIG. 3 each show an embodiment of the off-gas duct 9 in accordance with the present invention.

With reference to FIGS. 2 and 3, the present invention addresses the above-described undesirable slag foaming events caused by accretions from the off-gas duct 9 falling into the molten bath in the smelting vessel by providing an inlet section 18 (see the circled parts of FIGS. 2 and 3) of the off-gas duct 9 that extends upwardly (vertically in the embodiments shown in FIGS. 2 and 3) from a roof of the smelt cyclone 2 and is formed to cause off-gas to undergo a substantial change of direction as it flows through the inlet section. The substantial change in direction in the inlet section moves off-gas quickly away from the upward (in these embodiments vertical) extension of the smelting chamber and the cyclone chamber so that any accretions that form in the duct 9 are more likely to form downstream (in the direction of movement of off-gas) of and are laterally displaced from the inlet section and therefore cannot fall directly into the molten bath in the smelting chamber.

With reference to FIG. 2, the inlet section 18 of the off-gas duct 9 includes a bend, typically a dogleg bend, that defines an included angle α of approximately 100-115° between an upstream (in the direction of flow of off-gas) vertically extending leg 21 of the inlet section 18 and a downstream leg 22 of the inlet section 18. In other words, the inlet section includes the upstream leg 21 and the downstream leg 22, with the downstream leg 22 extending at the angle α from the upstream leg, 21 and defining the bend of the inlet section 18. The inlet section 18 is positioned so that the upstream leg 21 extends vertically upwardly from a roof of the smelt cyclone 2. The inlet section 18 is centrally positioned in the roof of the smelt cyclone 2. This arrangement channels the upwardly flowing off-gas from the smelt cyclone 2 into the inlet section 18. Almost immediately, the off-gas is caused to flow around the bend, i.e. with a substantial change of direction through the bend angle of 100-115° between the legs 21, 22 of the inlet section 18, and moves away from a vertical pathway in relation to the smelt cyclone 2 and the smelting vessel 4. The gas angle change through the bend is 65-80°. This arrangement minimizes the surface area of the wall of the off-gas duct 9 on which solid accretions can form and subsequently separate from the off-duct 9 and drop directly into the molten bath in the smelting vessel 4 and cause slag foaming events. The upstream leg 21 and the downstream leg 22 may be any suitable length. Typically, the legs 21 ate selected to be as short as possible so that the inlet section 18 is a high temperature zone.

In order to minimize accretion growth, the inlet section 18 is cooled by means of cooling elements in the form of water-cooled copper staves 19 in the section of the walls of the inlet section 18 that are the main contact surfaces for off-gas flowing through the inlet section 18, such as on the upper surface of the bend between the upstream leg 21 and the downstream leg 22 of the inlet section 18.

The off-gas duct 9 further includes a straight section 23 that is an extension of the downstream leg 22 that extends upwardly away from the inlet section 18 at an angle of 10-15° to the horizontal. The straight section 23 may be at any suitable angle to the horizontal and may be any suitable length. The straight section 23 ends in a downstream section 24 in the form of an upward dog-leg bend that defines an included angle β of at least 75° and typically 75-80°, between the straight section 23 and a vertically extending downstream leg 25 of the downstream section 24. The bend causes off gas to undergo another substantial change of direction (through a gas angle change of 75-80°) as it flows through the downstream section 24. This second change of direction facilitates separating accretions from the off gas. The downstream section is also a collection area for accretions that form on the walls of the off-gas duct downstream of the downstream section 24 and subsequently melt or fall off the walls. Over time, these accretions melt and the molten material flows back into the smelting cyclone 2 and the smelting vessel 4.

With reference to FIG. 3, the inlet section 18 of the embodiment of the off-gas area 9 shown in this Figure is formed as a bend, typically a dogleg bend, that defines an included angle α of approximately 90° between an upstream (in the direction of flow of off-gas) vertically extending leg 21 of the inlet section 18 and a downstream leg 22 of the inlet section 18. As described in relation to the FIG. 2 embodiment, the downstream leg 22 extends at the angle α from the upstream leg 21 and defines the bend of the inlet section 18. The inlet section 18 is positioned so that the upstream leg 21 extends vertically upwardly from a roof of the smelt cyclone 2. The inlet section 18 is centrally positioned in the roof of the smelt cyclone 2. This arrangement channels the upwardly flowing off-gas from the smelt cyclone 2 into the inlet section 18. Almost immediately, the off-gas is caused to flow around the bend, i.e. with a substantial change of direction, namely a gas angle change of 90°, and moves away from as vertical pathway in relation to the smelt cyclone 2 and the smelting vessel 4. This arrangement minimizes the surface area of the wall of the off-gas duct 9 on which solid accretions can form and subsequently separate from the duct and drop directly into the molten bath in the smelting vessel 4 and cause slag foaming events. In order to minimize accretion growth, the inlet section 18 is cooled by means of cooling elements in the form of water-cooled copper staves 19 in the sections of the walls of the inlet section 18 that are the main contact suffices for off-gas flowing through the inlet section 18, such as on the upper surface of the bend between the upstream leg 21 and the downstream leg 22 of the inlet section 18.

The off-gas duct 9 shown in FIG. 3 also includes a downstream section 24 in the form of a dog-leg bend that defines an included angle β of 70-75° between the downstream leg 22 of the inlet section 18 and an upwardly extending downstream leg 23 of the downstream section 24. The downstream section 24 is immediately after the section 18. The bend causes off-gas to undergo another substantial change of direction (through a gas angle change of 105-110°) as it flows through, the downstream section 24. This second change of direction facilitates separating accretions from the off-gas. The downstream section is also a collection area for accretions that form on the walk of the off-gas duct 9 downstream of the downstream section 24 and subsequently melt or fall off the walls. Over time, these accretions melt and the molten material flows back into the smelting cyclone 2 and the smelting vessel 4. The downstream leg 23 is a straight section that extends upwardly at an angle of 60-70° the horizontal.

The embodiments of the of gas duct 9 of the present invention shown in FIGS. 2 and 3 are effective options far minimising accretions in, the off-gas duct 9 dropping directly into the molten bath in the smelting vessel 4 and causing slag foaming events.

Many modifications may be made to the embodiments of the present invention described above without departing from the spirit and scope of the invention.

By way of example, whilst each embodiment includes two dog-leg bends in the inlet section 18 and the downstream section 24, the present invention is not so limited and the broadest embodiments of the invention include a single dog-leg bend in the inlet section 18. The invention also extends to arrangements in which there are more than two bends.

Furthermore, the present invention is not limited to the particular relative dimensions of the legs and other parts of the off-gas ducts 9 in the embodiments shown in FIGS. 2 and 3.

Furthermore, whilst the legs 21 of the inlet sections 18 of the off-gas ducts 9 of the embodiments shown in FIGS. 2 and 3 are vertical legs 21, the present invention is not so limited and includes arrangements in which the legs 21 extend upwardly but not necessarily vertically. The selection of the angle for the legs 21 is governed by an objective of wanting to minimise the possibility of accretions forming on the legs 21.

Furthermore, whilst the bend in the inlet section 18 is defined by straight legs 21, 22, the invention is not limited to this arrangement and extends to arrangements in which one o both of the legs 21, 22 is curves or another profile.

The invention claimed is:
1. A smelting apparatus includes
   a smelting vessel that includes a smelting chamber adapted to contain a bath of molten metal and slag;
   a smelt cyclone for pre-treating a metalliferous feed material that is positioned above and communicates directly with the smelting vessel; and
   an off-gas duct extending from the smelt cyclone for discharging an off-gas from the smelt cyclone, with the off-gas duct having:
      an inlet section that extends upwardly from the smelt cyclone, wherein the inlet section includes:
         an upward extension of the smelt cyclone that defines an upstream leg of the inlet section, and
         a downstream leg of the inlet section, with the downstream leg extending at an angle to the upstream leg so that the off-gas undergoes a first substantial change in direction as it moves through a bend that interconnects the upstream and the downstream legs; and
      a downstream section extending upwardly from the downstream leg of the inlet section defining a collecting area to collect solid accretions in the off-gas, the downstream section is formed to cause off-gas to undergo a second substantial change of direction as it flows through the downstream section.

2. The apparatus defined in claim 1 wherein the inlet section is in the form of a dog-leg bend that defines an included angle of at least 90° between the upstream leg of the inlet section and the downstream leg of the inlet section, with the bend causing off-gas to undergo the substantial change of direction through the angle as it flows through the inlet section into the off-gas duct.

3. The apparatus defined in claim 1 wherein the bend of the inlet section is configured to be cooled, to prevent growth of the solid accretions in the bend.

4. The apparatus defined in claim 1 wherein the downstream section includes a dog-leg bend that defines an included angle of 60-90°, between an upstream leg in the direction of flow of off-gas, leg and a downstream leg of the downstream section, with the bend causing off-gas to undergo the substantial change of direction through the angle as it flows through the downstream section.

5. The apparatus defined in claim 1 wherein the smelt cyclone includes tuyeres for injecting solid feed materials and oxygen-containing gas into the cyclone chamber.

6. The apparatus defined in claim 1 wherein the smelting vessel includes lances for injecting solid feed materials and oxygen-containing gas into the smelting chamber.

* * * * *